United States Patent [19]

Tate

[11] Patent Number: 4,574,220

[45] Date of Patent: Mar. 4, 1986

[54] COMBINATION ELECTRIC POWER BUS AND FLUORESCENT DROP LIGHT

[76] Inventor: Ernest L. Tate, 9628 San Diego St., Spring Valley, Calif. 92077

[21] Appl. No.: 467,890

[22] Filed: Apr. 1, 1983

[51] Int. Cl.[4] ..................... H05B 37/02; H05B 41/00; H02G 11/02

[52] U.S. Cl. ...................................... 315/57; 315/362; 191/12.2 R

[58] Field of Search ......................... 191/12.2 R, 12.4; 315/57, 62, 362; 362/387

[56] References Cited

U.S. PATENT DOCUMENTS

| | | | |
|---|---|---|---|
| 3,551,736 | 12/1970 | Doehner | 315/57 X |
| 3,733,478 | 6/1971 | Barker | 362/387 |
| 3,987,334 | 10/1976 | Anderson | 315/57 |
| 4,282,954 | 8/1981 | Hill | 191/12.4 |
| 4,284,180 | 8/1981 | Masters | 191/12.2 R |
| 4,300,665 | 11/1981 | Arechaga | 191/12.4 |
| 4,350,850 | 9/1982 | Kovacik et al. | 191/12.2 R |

*Primary Examiner*—Robert B. Reeves
*Assistant Examiner*—David F. Hubbuch
*Attorney, Agent, or Firm*—Thomas J. Tighe

[57] ABSTRACT

A three wire, single phase AC, power transmission bus having an AC source wire, a neutral wire, and a fluorescent lamp ballast wire. A conventional single phase device is connected across the source wire and the neutral wire for power. A fluorescent lamp is connected across the source wire and the ballast wire for power. If an outlet of the bus is a conventional three prong receptacle, the ballast wire is connected to the prong which is conventionally reserved for a ground reference.

11 Claims, 5 Drawing Figures

COMBINATION ELECTRIC POWER BUS AND FLUORESCENT DROP LIGHT

BACKGROUND OF INVENTION

This invention relates in general to electric power buses and reels, and more specifically to those that are adaptable for two wire alternating current (AC hereinafter) devices and for fluorescent lamps. As used herein, the terms "fluorescent lamp", "fluorescent lamps", and "fluorescent light" shall refer to a fluorescent lamp (or light) circuit without a ballast.

In use now are retracting extension cords (used for 110 AC power accessories) and retracting fluorescent lamps. This requires the worker to have two retractable cords at considerable expense.

The limitations of each are obvious: the AC cord cannot be used for a fluorescent lamp (does not have a ballast) and the fluorescent cord cannot be used for power tools (does not have a receptacle and has a ballast wired in line). Also because of the nature of the fluorescent lamp reel, it cannot be extended beyond the fixed length of its manufacture unless it is disconnected from its mounting place and extended with an AC cord before the ballast. This causes the bulky reel assembly to be in the workers way or left dangerously on the floor.

The present invention is an improvement over previous cord lamps in many ways. It doubles as both an extension cord and a lamp. It allows other receptacles free for use. Although the length of the retractable cord is fixed, by adding an extension cord to the outlet both the extension cord and the fluorescent lamp can be extended to any length without removing the unit from its fixed position. A fluorescent lamp in a plastic shield is used instead of an incandescent lamp, because it is more shock proof and resistant to explosion when subject to water. The cord reel itself is shock-proof because of being designed to ground through flexible contacts instead of the case as with previously designed units.

SUMMARY

This invention presents an electric AC power transmission bus comprising two wires in electrical communication with a source of single phase AC power. A first terminal of a two-terminal, fluorescent lamp ballast means is in electrical communication with the second wire. A third wire is in electrical communication with the second terminal of the ballast means. A three contact first coupling means outlet is in electrical communication with the three wires, one wire per one contact. A fluorescent lamp draws its power from the two contacts electrically connected to the first and third wires. All other conventional, single phase devices draw their power from the contacts electrically connected to the first and second wires. Preferably the transmission bus is an extension cord adapted at one end to plug into a conventional, single phase AC outlet, and adapted at the other end to receive a second coupling means, preferably a conventional, single phase AC plug (3 prongs). The fluorescent lamp preferably has two ionizing terminals and an unconventional connection to a conventional three prong plug. One ionizing terminal of the lamp electrically connects to a prong conventionally reserved for the AC source. The other ionizing terminal electrically connects to a prong conventionally reserved for a ground reference.

An object of this invention is to provide an electric transmission bus for use by conventional, single phase AC devices, but also for use by a fluorescent lamp.

DESCRIPTION OF THE PREFERRED EMBODIMENT

Figure 1:
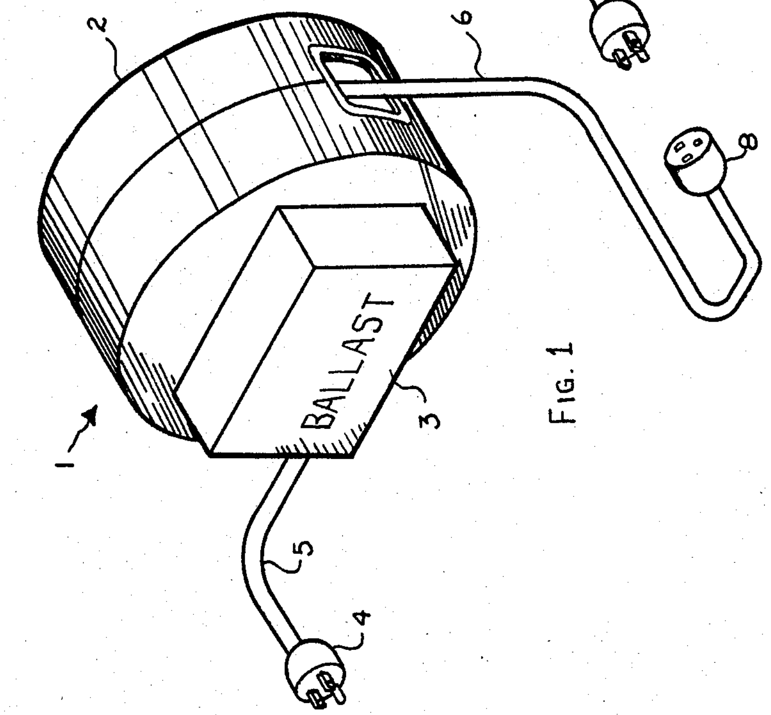
FIG. 1 is a pictorial view of a cord and reel assembly with a ballast affixed thereto.

Refering to FIG. 1, an assembled cord reel 1 is shown. It is a conventional cord reel having an outer casing 2 and an inner spooling cylinder (not shown). Attached to one side of the casing 2 is a conventional, two terminal, fluorescent lamp ballast 3. A conventional three prong plug 4 and pre-reel cord 5 are adapted to bring single phase AC power to the reel 1. Post-reel cord 6 can be wound or unwound about the spooling cylinder to any extent necessary to deliver power to conventional single phase devices and to an unconventionally wired fluorescent lamp 10, both via a conventional three contact outlet receptacle 8.

Figure 1A:
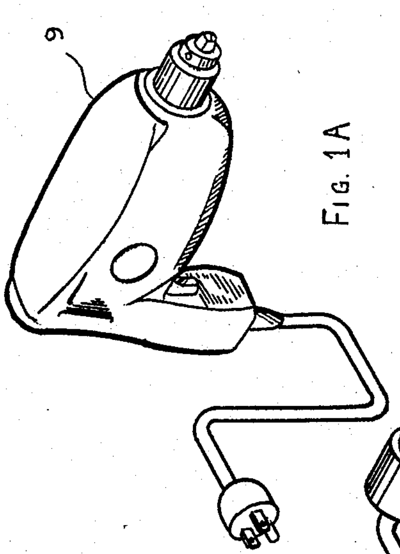
FIG. 1A is a pictorial view of a typical device which can be power extended by this invention.
Figure 1B:
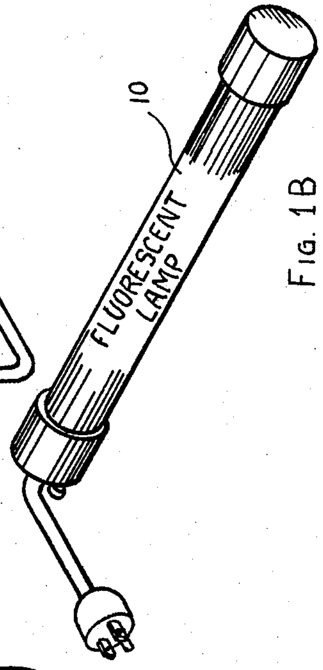
FIG. 1B is a pictorial view of a typical fluorescent lamp for use with this invention.

FIGS. 1A and 1B show the two basic types of tools that can be operated from the cord. 1A being a 110 AC powered drill 9 and 1B being a fluorescent lamp 10.

Figure 2:
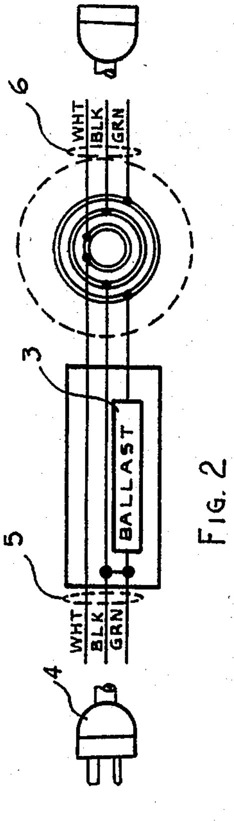
FIG. 2 is a schematical representation of the cord reel assembly.

FIG. 2 is the wiring diagram of the cord reel assembly. Three wires 5 go from a male receptacle 4 (which can be plugged into any AC outlet) into a control box which has a ballast 3 to the reel assembly. The reel has three fixed contact rings and three movable flexible wiper contacts so that all three wires that extend from the reel are usable (previous designs have the wires going into the reel and only two usable ones leaving. The third wire is grounded to the reel assembly, normally made of metal. This could cause severe electrical shock if tool shorts when using). The wiring is such that the ground is totally insulated from the case.

Figure 3:
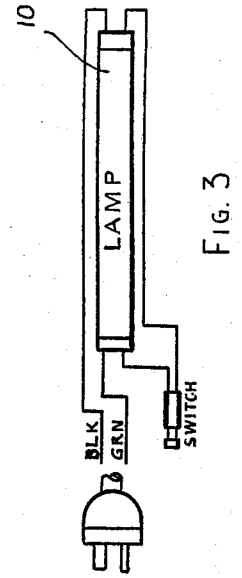
FIG. 3 is a partial schematical representation of the fluorescent lamp.

FIG. 3 is the fluorescent lamp assembly. It is wired to only use the black wire which is 110 AC and the green wire which is the ballast. Shock is prevented also by bridging the ballast to the white wire which is neutral.

I claim:

1. An AC electric power bus for powering conventional single-phase AC devices and for alternately providing fluorescent lighting, comprising:
   (a) a first and a second wire connected across a source of AC electric power,
   (b) a fluorescent lamp ballast means having two terminals, a first terminal being in electrical communication with the second wire,
   (c) a first coupling means having three electrical contacts, a first contact being in electrical communication with the first wire, a second contact being in electrical communication with the second wire, and a third contact being in electrical communication with a second terminal of the ballast means, the first and second contacts being adapted to outlet the AC electric power to the conventional AC devices, (d) a second coupling means having at least two contacts and adapted to mate with the first coupling means such that when they are mated a first contact of the second coupling means is in electrical communication with the first contact of the first coupling means, and a second contact of the second coupling means is in electrical communication with the third contact of the first coupling means, and (e) a fluorescent tube having two ionizing terminals, a first ionizing terminal being in electrical communication with the first contact of the second coupling means, and a second ionizing terminal being in electrical communication with the second contact of the second coupling means.

2. An AC electric power extension cord for powering conventional single-phase AC devices and for alternately providing fluorescent lighting, comprising:

(a) a first and a second wire, (b) plug means adapted to couple the first and second wires in electrical communication to an AC electric power source, (c) a fluorescent lamp ballast means having two terminals, a first terminal being in electrical communication with the second wire, (d) a first coupling means having three electrical contacts, a first contact being in electrical communication with the first wire, a second contact being in electrical communication with the second wire, and a third contact being in electrical communication by a third wire with a second terminal of the ballast means, the first and second contacts being adapted to outlet the AC electric power to the conventional AC devices, (e) a second coupling means having at least two contacts and adapted to mate with the first coupling means such that when they are mated a first contact of the second coupling means is in electrical communication with the first contact of the first coupling means, and a second contact of the second coupling means is in electrical communication with the third contact of the first coupling means, and (f) a fluorescent tube having two ionizing terminals, a first ionizing terminal being in electrical communication with the first contact of the second coupling means, and a second ionizing terminal being in electrical communication with the second contact of the second coupling means.

3. The extension cord of claim 2 further comprising a cord reel assembly bisecting each of the three wires intermediate the ballast means and the first coupling means, the means of bisection comprising:

(a) three contact rings affixed to a non-rotatable portion of the cord reel assembly, the rings being in electrical communication with a first section of the three wires, one wire per ring, and (b) three wiper contacts affixed to a rotatable portion of the cord reel assembly and adapted to be and remain in electrical communication with the contact rings, one wiper per contact ring, the wipers being in electrical communication with a second section of the three wires, the contact rings and the contact wipers providing separate electrical continuity between both sections of the wires.

4. The extension cord of claim 3 wherein the first coupling means is a conventional three-socket, single-phase AC receptacle having a ground socket, an AC source socket and a neutral socket; wherein the third wire is electrically connected to the ground socket; and wherein the first and second wires are electrically connected to the AC source and neutral sockets, respectively.

5. The extension cord of claim 4 wherein the ballast is physically affixed to the cord reel assembly.

6. The extension cord of claim 4 wherein the plug means comprises a conventional three-pronged, single-phase AC plug having a ground prong, and wherein the first terminal of the ballast means is in electrical communication with the ground plug.

7. The extension cord of claim 3 wherein the ballast is physically affixed to the cord reel assembly.

8. The extension cord of claim 7 wherein the plug means comprises a conventional three-pronged, single-phase AC plug having a ground prong, and wherein the first terminal of the ballast means is in electrical communication with the ground plug.

9. The extension cord of claim 2 wherein the first coupling means is a conventional three-socket, single-phase AC receptacle having a ground socket, an AC source socket and a neutral socket; wherein the third wire is electrically connected to the ground socket; and wherein the first and second wires are electrically connected to the AC source and neutral sockets, respectively.

10. The extension cord of claim 9 wherein the plug means comprises a conventional three-pronged, single-phase AC plug having a ground prong, and wherein the first terminal of the ballast means is in electrical communication with the ground plug.

11. The extension cord of claim 2 wherein the plug means comprises a conventional three-pronged, single-phase AC plug having a ground prong, and wherein the first terminal of the ballast means is in electrical communication with the ground plug.

* * * * *